United States Patent
Ogasawara et al.

(10) Patent No.: US 8,344,903 B2
(45) Date of Patent: Jan. 1, 2013

(54) INSTRUMENTAL DEVICE

(75) Inventors: Yukio Ogasawara, Niigata (JP); Shuichi Nomizu, Niigata (JP); Toshiyuki Ohtake, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 224 days.

(21) Appl. No.: 12/865,593

(22) PCT Filed: Dec. 16, 2008

(86) PCT No.: PCT/JP2008/072801
§ 371 (c)(1),
(2), (4) Date: Jul. 30, 2010

(87) PCT Pub. No.: WO2009/096105
PCT Pub. Date: Aug. 6, 2009

(65) Prior Publication Data
US 2010/0328091 A1     Dec. 30, 2010

(30) Foreign Application Priority Data

Jan. 30, 2008   (JP) .................................. 2008-019709

(51) Int. Cl.
*G08B 5/24* (2006.01)
*B60Q 1/00* (2006.01)
*H01R 12/00* (2006.01)
*G01D 11/28* (2006.01)

(52) U.S. Cl. ..................... 340/815.78; 439/57; 340/461; 116/288

(58) Field of Classification Search ................... 439/157
See application file for complete search history.

(56) References Cited

U.S. PATENT DOCUMENTS

| | | | | |
|---|---|---|---|---|
| 5,437,185 | A * | 8/1995 | Panzica ........................... | 73/493 |
| 6,677,723 | B2 * | 1/2004 | Shimazaki ..................... | 318/696 |
| 7,193,729 | B1 * | 3/2007 | Li ................................. | 356/614 |
| 7,347,160 | B2 * | 3/2008 | Honma et al. ................. | 116/288 |
| 2007/0190832 | A1 * | 8/2007 | Totsuka ......................... | 439/157 |

FOREIGN PATENT DOCUMENTS

| | | |
|---|---|---|
| DE | 43 21 146 A1 | 1/1995 |
| JP | 56-036180 Y2 | 10/1978 |
| JP | 61-35995 Y2 | 7/1980 |
| JP | 02-034626 Y2 | 3/1986 |

* cited by examiner

*Primary Examiner* — Albert Wong
*Assistant Examiner* — Pameshanand Mahase
(74) *Attorney, Agent, or Firm* — McDermott Will & Emery LLP

(57) ABSTRACT

An instrumental device is provided which includes a variable display portion and a pointer moving around the variable display portion and achieves excellent response and resistance to vibration without complicating the shape of a member. The instrumental device has a display plate 21 having a variable display portion 21b, a pointer 23 moving around the variable display portion 21b, and pointer drive means 25, 26 provided on the back-face side of the display plate 21 for moving the pointer 23. The instrumental device includes a guide rail portion 22 provided in the display plate 21 to surround the periphery of the variable display portion 21b, the pointer 23 being located on the guide rail portion 22, a holding portion 24 holding the pointer 23 movably along the guide rail portion 22, a first magnet 24c provided in the pointer 23 or the holding portion 24, and a second magnet 25a provided in the pointer drive means 25, 26 such that the second magnet 25a is opposite to the first magnet 24c,
  wherein the pointer 23 is rotated in association with rotation drive of the pointer drive means 25, 26 by attraction force of the first and second magnets 24c, 25a.

5 Claims, 5 Drawing Sheets

INSTRUMENTAL DEVICE

RELATED APPLICATIONS

This application is the U.S. National Phase under 35 U.S.C. §371 of International Application No. PCT/JP2008/072801, filed on Dec. 16, 2008, which in turn claims the benefit of Japanese Application No. 2008-019709, filed on Jan. 30, 2008, the disclosures of which Applications are incorporated by reference herein.

TECHNICAL FIELD

The present invention relates to an instrument device which includes a variable display portion and a pointer moving around the variable display portion.

BACKGROUND ART

There have been conventionally instrumental devices in which a pointer points at an indicating portion on a dial (display plate) to display predetermined information. In such an instrumental device, the pointer is directly secured to a rotation shaft of pointer drive means such as a stepping motor, and the pointer is rotated in association with rotation drive of the pointer drive means and thus caused to point at the indicating portion.

Some of the instrumental devices include a large variable display portion such as a liquid crystal display portion at the center of a display plate such that the variable display portion displays predetermined information, and also includes a pointer moving around the variable display portion such that the pointer displays predetermined information. Such a configuration is disclosed, for example in Patent Document 1.

An instrumental device disclosed in Patent Document 1 is formed to use a pointer having a bent shape which bypasses a variable display portion from a back-face side to a front-face side of a display plate.

Patent Document 1: DE4321146A1

DISCLOSURE OF THE INVENTION

Problems that the Invention is to Solve

The instrumental device of the configuration as disclosed in Patent Document 1, however, has the problem in which the complicated structure of the pointer increases the length and weight of the pointer to prevent rotation of the pointer with excellent response. In addition, since the pointer is simply secured to the pointer drive means, the problem of poor resistance to vibration is presented when the device is used for a vehicle instrument used in harsh environments. Thus, the instrumental devices have potential for improvement.

The present invention has been made in view of the above-mentioned problems, and it is an object thereof to provide an instrumental device which includes a variable display portion and a pointer moving around the variable display portion and achieves excellent response and resistance to vibration without complicating the shape of a member.

Means for Solving the Problems

To solve the problems, the present invention is characterized by an instrumental device having a display plate having a variable display portion, a pointer moving around the variable display portion, and pointer drive means provided on the back-face side of the display plate for moving the pointer, including a guide rail portion provided in the display plate to surround the periphery of the variable display portion, the pointer being located on the guide rail portion, a holding portion holding the pointer movably along the guide rail portion, a first magnet provided in the pointer or the holding portion, and a second magnet provided in the pointer drive means such that the second magnet is opposite to the first magnet, wherein the pointer is rotated in association with rotation drive of the pointer drive means by attraction force of the first and second magnets.

The present invention is characterized by including a regulating portion provided for the holding portion and regulating the position of the pointer located on the guide rail portion, and a guide portion provided for the guide rail portion and having a shape conforming to the regulating portion.

The present invention is characterized in that the regulating portion is formed of a protrusion portion protruding from the holding portion.

The present invention is characterized in that the regulating portion is formed of a rotation member rotating along the guide portion.

The present invention is characterized in that each of the regulating portion and the guide portion has an inclined surface, the inclined surfaces thereof abutting each other.

Advantage of the Invention

The present invention relates to an instrumental device which includes a variable display portion and a pointer moving around the variable display portion and achieves excellent response and resistance to vibration without complicating the shape of a member.

Figure 1:
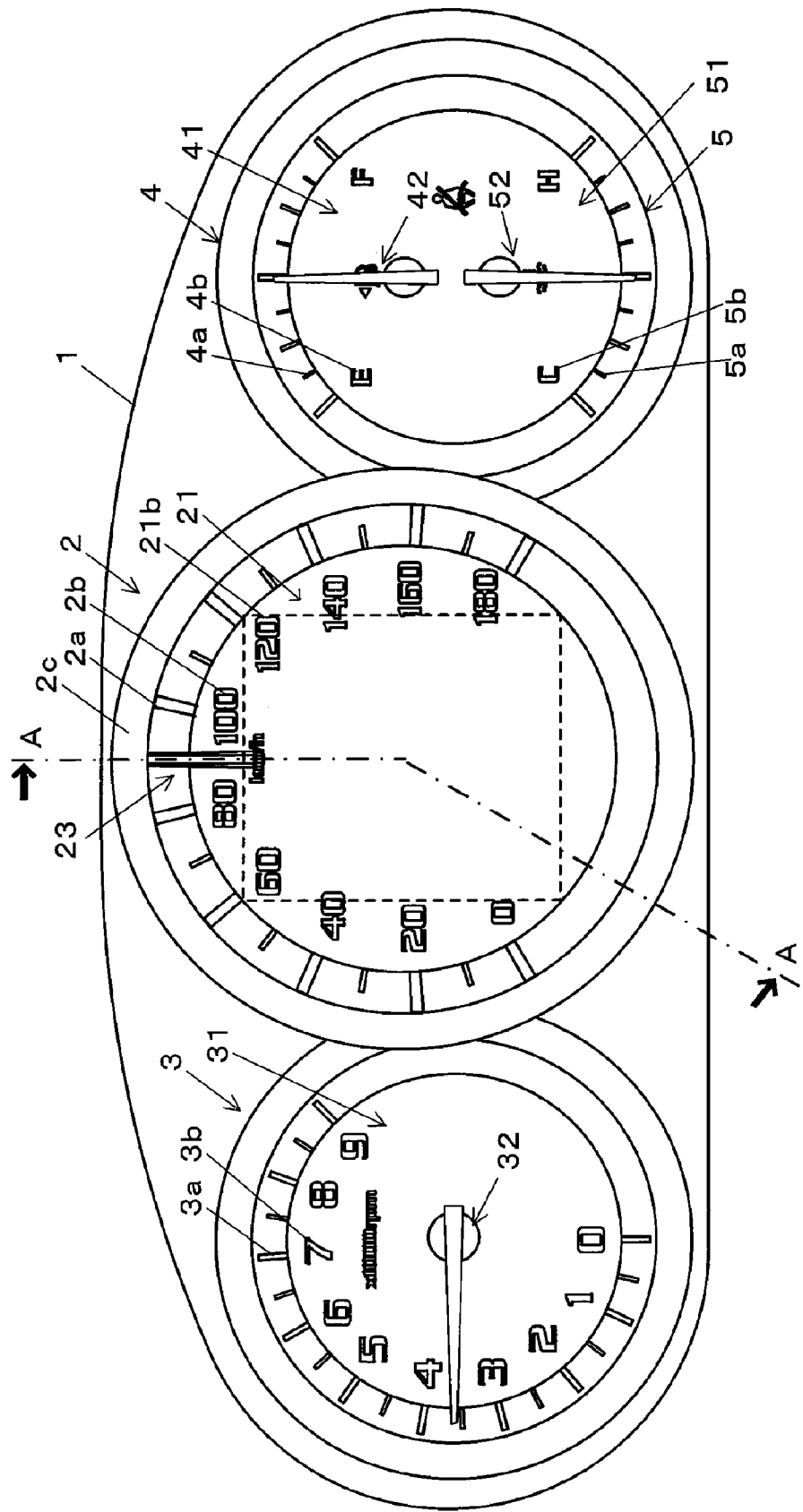
FIG. 1 A front view showing a first embodiment of the present invention.

DESCRIPTION OF REFERENCE NUMERALS AND SIGNS 21 display plate
21a light-transmitting substrate
21b liquid crystal display portion (variable display portion)
22 guide rail portion
22a hollow portion
22b, 22c guide portion
23 pointer
23a pointer base portion
23b pointing portion
24 holding portion
24a mounting portion
24b, 24e to 24g regulating portion
24c first magnet
24d first yoke 25 arm member
25a second magnet
25b second yoke
26 stepping motor
27 circuit substrate

BEST MODE FOR CARRYING OUT THE INVENTION

In the following, a first embodiment in which the present invention is applied to a vehicle combination meter will be described with reference to the accompanying drawings.

In FIG. 1, reference numeral 1 shows a housing. The housing 1 has a shade member and a case body to accommodate four indicators, that is, a speed meter 2, a rotation meter 3, a fuel meter 4, and a water-temperature meter 5. The speed meter 2 is larger than the rotation meter 3, the fuel meter 4, and the water-temperature meter 5, and is placed between the rotation meter 3, and the fuel meter 4 and the water-temperature meter 5. The speed meter 2 has a display plate 21 and a pointer 23. The rotation meter 3, the fuel meter 4, and the water-temperature meter 5 have dials 31, 41, 51, and pointers 32, 42, 52, respectively. The dials 31, 41, 51 are provided by forming indicating portions 3a, 4a, 5a three-dimensionally on substrates made of light-transmitting resin (for example, polycarbonate) and forming light-shield portions through printing except for character portions 3b, 4b, 5b, respectively. The pointers 32, 42, 52 are rotated by a stepping motor (not shown) to point at the indicating portions 3a, 4a, 5a of the dials 31, 41, 51, respectively.

Figure 2:
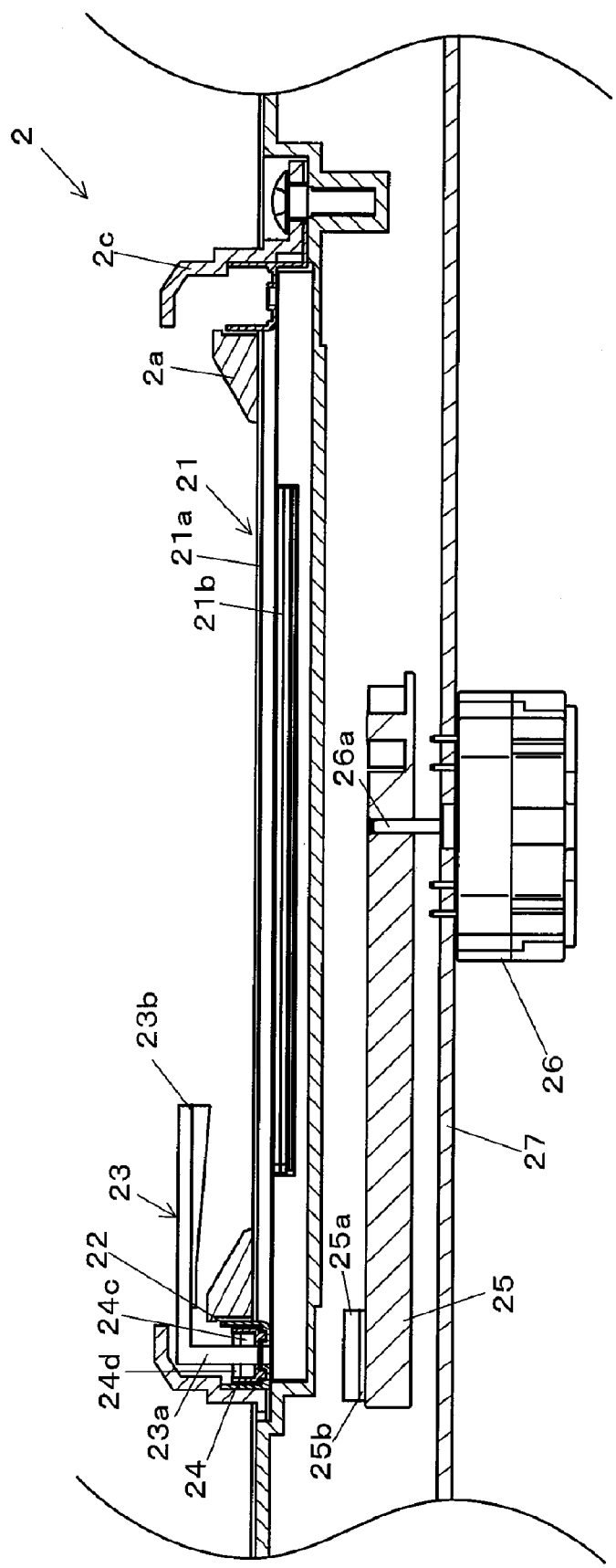
FIG. 2 A section view showing the first embodiment of the present invention.

FIG. 2 is an enlarged section view showing main portions. The speed meter 2 has the display plate 21, a guide rail portion 22, the pointer 23, a holding portion 24, an arm member 25, and the stepping motor 26. Reference numeral 27 shows a circuit substrate on which the stepping motor 26 is mounted.

The display plate 21 is formed of a light-transmitting substrate 21a and a liquid crystal display portion (variable display portion) 21b.

The light-transmitting substrate 21a is made of light-transmitting resin (for example, acrylic or polycarbonate). On the light-transmitting substrate 21a, an indicating portion 2a is provided three-dimensionally to be positioned around the liquid crystal display portion 21b in accordance with the moving range of the pointer 23, and a character portion 2b is formed through cutting or the like.

The liquid crystal display portion 21b is provided by sealing-in liquid crystal between a pair of light-transmitting substrates having a transparent electrode film formed thereon to provide a liquid crystal cell and then bonding a polarizing plate onto both surfaces of the liquid crystal cell. For example, a liquid crystal display of dot-matrix type is used. The liquid crystal display portion 21b can display variable contents and can selectively display various types of information such as a total driving distance, fuel economy, and alarm information.

Figure 3:
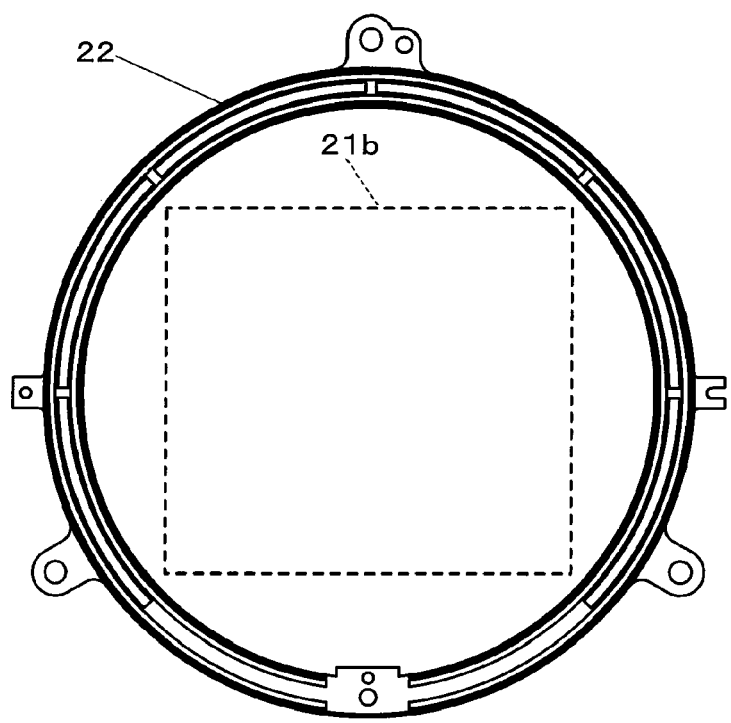
FIG. 3 A diagram showing a guide rail portion in the first embodiment of the present invention.
Figure 4:
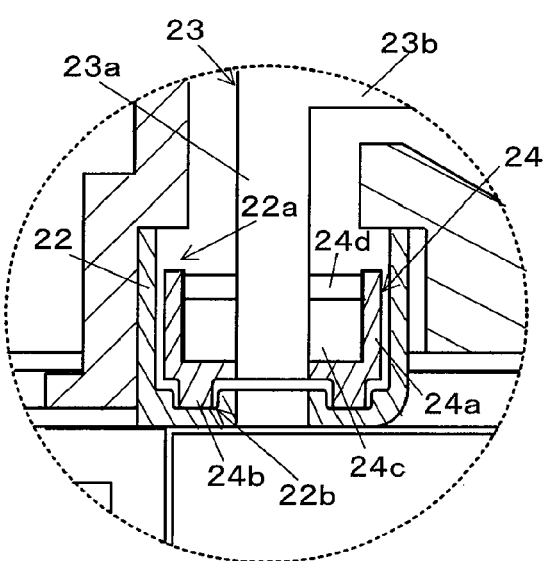
FIG. 4 An enlarged section view of main portions to show the first embodiment of the present invention.

The guide rail portion 22 is provided to surround the periphery of the liquid crystal display portion 21b on the display plate 21 and is provided, for example, by forming light-transmitting resin into an arc shape as shown in FIG. 3. The guide rail portion 22 has a hollow portion 22a capable of accommodating the pointer 23 and has a guide portion 22b of hollow shape at its bottom portion where a regulating portion of a holding portion 24, later described, is placed, as shown in FIG. 4. The guide rail portion 22 is covered with a decoration ring 2c provided on the front-face side of the display plate 21 such that a user cannot visually recognize the guide rail portion 22.

As shown in FIGS. 2 and 4, the pointer 23 is made of light-transmitting resin such as polycarbonate, and is formed of a pointer base portion 23a, one end portion of which is located in the guide rail portion 22, and a pointing portion 23b which is extended from the other end portion of the pointer base portion 23a and points at the indicating portion 2a. The pointer 23 is moved around the liquid crystal display portion 21b along the guide rail portion 22 to point at the indicating portion 2a to display predetermined information (vehicle speed in the present embodiment).

The holding portion 24 is made of light-shield resin material, for example ABS resin, and has a mounting portion 24a for holding the pointer 23 movably along the guide rail portion 22 in the guide rail portion 22 and the regulating portion 24b formed in the bottom portion of the mounting portion 24a. The regulating portion 24b is a protrusion portion which protrudes downward from the mounting portion 24a and is placed in the guide portion 22b provided for the guide rail portion 22 and formed in the hollow shape conforming to the shape of the regulating portion 24b to determine the position of the pointer 23 with reference to the guide rail portion 22. It is also possible that the shapes of the regulating portion 24b and the guide portion 22b can be adjusted to determine the angle formed by the guide rail portion 22 and the pointer 23 at a predetermined angle.

A first magnet 24c and a first yoke 24d are located to be positioned around the pointer 23 in the mounting portion 24a of the holding portion 24. The first magnet 24c and the first yoke 24d may be located directly on the pointer 23.

The first magnet 24c is located to be positioned around the pointer base portion 23a accommodated in the guide rail portion 22. The first magnet 24c and a second magnet 25a, later described, attract each other.

The first yoke 24d is provided closer to a surface of the first magnet 24c that is not opposite to the second magnet 25a (the non-opposite surface). The first yoke 24d constitutes a magnet circuit which suppresses leakage flux from the non-opposite surface of the first magnet 24c to improve the magnet efficiency.

The arm member 25 has the second magnet 25a and a second yoke 25b at one end and has the other end fitted to a rotation shaft 26a of the stepping motor 26. Pointer drive means in the present embodiment is formed of the arm member 25 and the stepping motor 26.

The second magnet 25a is placed at the position opposite to the first magnet 24c with the display plate 21 interposed between them to form a pair with the first magnet 24c. The second magnet 25a may be provided with a method in which the arm member 25 is formed by using resin material (for example, engineering plastic), the second magnet 25a is formed by using a different member from the arm member 25, and then insert molding or outsert molding is performed for integral formation, or with a method in which the arm member 25 is formed by using plastic magnet and the portion thereof opposite to the first magnet 24c is magnetized.

The second yoke 25b is provided closer to a surface of the second magnet 25a that is not opposite to the first magnet 24c (the non-opposite surface). The second yoke 25b constitutes a magnet circuit which suppresses leakage flux from the non-opposite surface of the second magnet 25a to improve the magnet efficiency.

In the present embodiment, the first magnet 24c is provided in the pointer 23 placed in the guide rail portion 22, and the second magnet 25a is provided in the arm member 25 secured to the rotation shaft 26a of the stepping motor 26 such that the second magnet 25a is opposite to the first magnet 24c with the display plate 21 interposed between them. Since the first magnet 24c and the second magnet 25a attract each other by the magnetic force, the pointer 23 can be moved along the guide rail portion 22 in association with the rotation drive of the stepping motor 26. Therefore, even when the variable display portion is provided at the center of the display plate, the pointer is not increased in size or complicated due to the bypassing of the variable display portion as in the conventional method in which the pointer is directly secured to the stepping motor, so that the pointer 23 can be moved with excellent response.

In addition, the regulating portion 24b which determines the position of the pointer 23 located on the guide rail portion 22 is provided for the holding portion 24 which holds the pointer 23, and the guide portion 22b conforming to the regulating portion 24b is provided for the guide rail portion 22. This can reduce displacement of the pointer 23 from the indicating portion 2a to enable pointing at the indicating portion 2a with high accuracy. Furthermore, the attraction force of the first and second magnets 24c, 25a supplies the holding portion 24 with a certain tension to the guide rail portion 22, which can prevent small movements of the pointer 23 within the guide rail portion 22 to improve resistance to vibration.

For the shape of the regulating portion in the present invention, various shapes or members can be applied in addition to that in the first embodiment.

Figure 5:
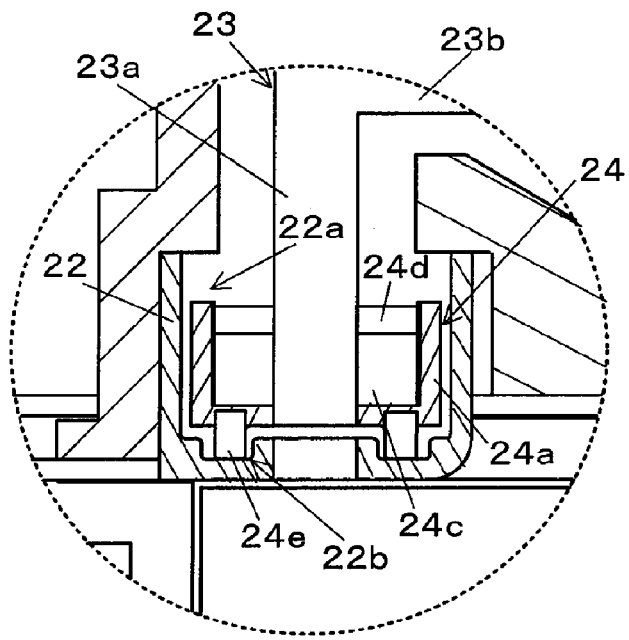
FIG. 5 An enlarged section view of main portions to show a second embodiment of the present invention.

FIG. 5 shows a second embodiment of the present invention. The second embodiment differs from the abovementioned first embodiment in that a regulating portion 24e provided for a holding portion 24 is formed of a roller member which rotates along a guide portion 22b provided for a guide rail portion 22. The regulating portion 24e formed of the roller member can suppress displacement of a pointer 23 and smoothly move the pointer 23 to improve response.

Figure 6:
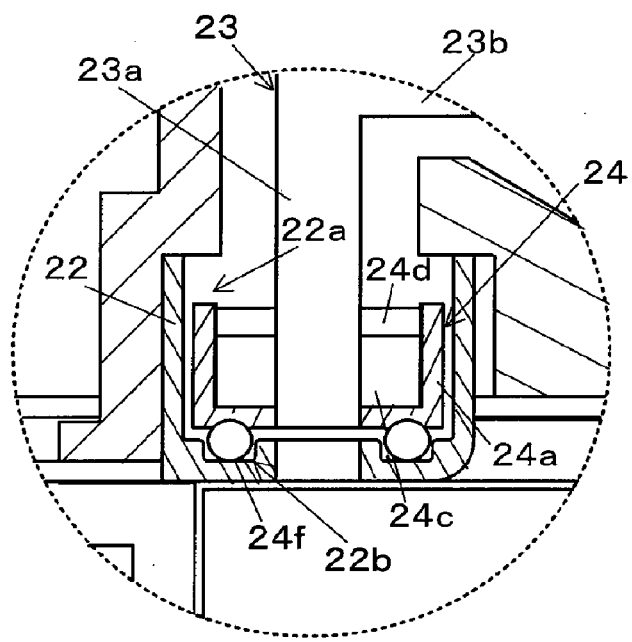
FIG. 6 An enlarged section view of main portions to show a third embodiment of the present invention.

FIG. 6 shows a third embodiment of the present invention. The third embodiment differs from the abovementioned first embodiment in that a regulating portion 24f provided for a holding portion 24 is formed of a ball member which rotates along a guide portion 22b provided for a guide rail portion 22. The regulating portion 24f formed of the ball member can suppress displacement of a pointer 23 and smoothly move the pointer 23 to improve response.

Figure 7:
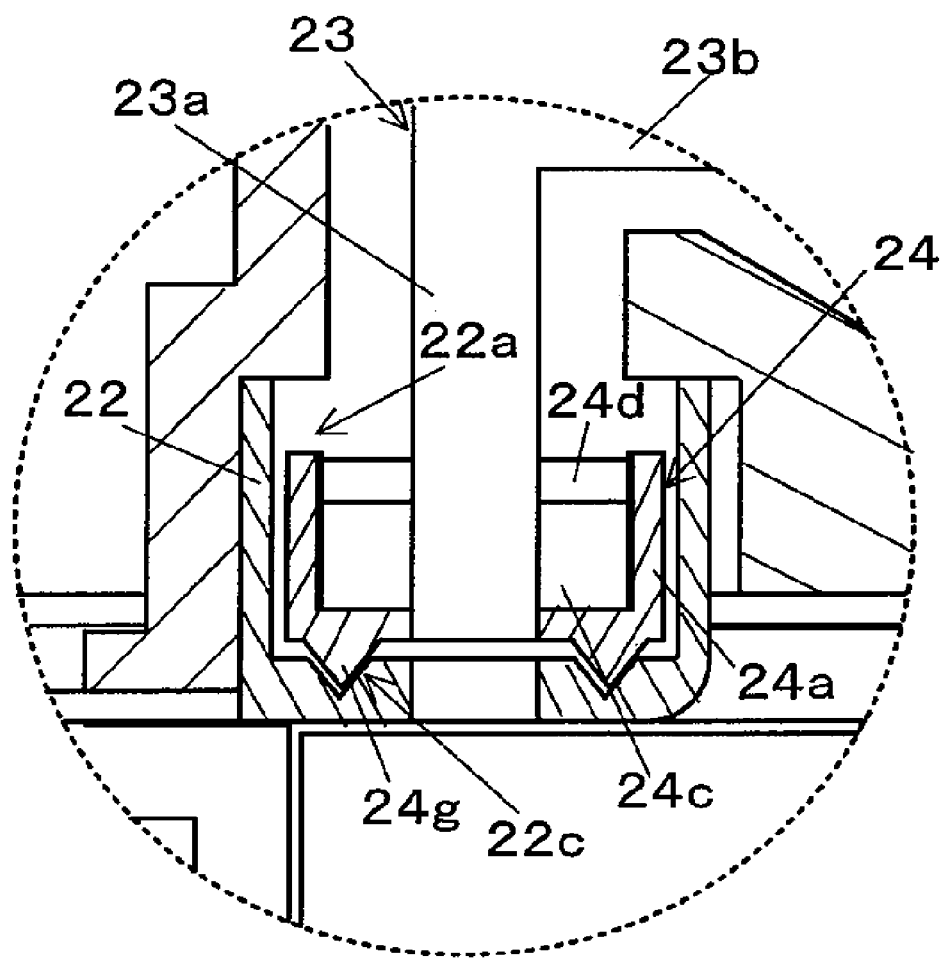
FIG. 7 An enlarged section view of main portions to show a fourth embodiment of the present invention.

FIG. 7 shows a fourth embodiment of the present invention. The fourth embodiment differs from the abovementioned first embodiment in that a regulating portion 24g provided for a holding portion 24 is formed of a linear protrusion portion which has an inclined surface, and in that a guide portion 22c provided for a guide rail portion 22 is formed of a V-shaped groove portion which has an inclined surface abutting on the regulating portion 24g. The abutting inclined surface may be on any of left and right sides in FIG. 7. The abutment of the regulating portion 24g and the guide portion 22b with the inclined surfaces can prevent small movements of the regulating portion 24g within the guide portion 22c to suppress displacement of a pointer 23 to improve resistance to vibration.

While the first and second magnets 24c, 25a are permanent magnets, the second magnet 25a may be an electromagnet, for example. A display with an organic EL element may be used as the variable display element in addition to the liquid crystal display portion 21b. While the stepping motor 26 is included as the pointer drive means, it goes without saying that a cross-coil movement may be used, for example, instead of the stepping motor 26.

INDUSTRIAL APPLICABILITY

The present invention relates to an instrumental device and is preferable for an instrumental device which includes a variable display portion and a pointer moving around the variable display portion.

The invention claimed is:

1. An instrumental device having a display plate having a variable display portion, a pointer moving around the variable display portion, and pointer drive means provided on a back-face side of the display plate for moving the pointer, comprising:
    a guide rail portion provided in the display plate to surround a periphery of the variable display portion, the pointer being located on the guide rail portion;
    a holding portion holding the pointer movably along the guide rail portion;
    a first magnet provided in the pointer or the holding portion; and
    a second magnet provided in the pointer drive means such that the second magnet is opposite to the first magnet,
    wherein:
    the pointer is moved in association with rotation drive of the pointer drive means by attraction force of the first and second magnets,
    the pointer drive means is formed of an arm member and a stepping motor,
    the arm member is secured to a rotation shaft of the stepping motor,
    the second magnet is formed on the arm member, and
    the second magnet is opposes the first magnet.

2. The instrumental device according to claim 1, further comprising a regulating portion provided for the holding portion and regulating a position of the pointer with reference to the guide rail portion, and a guide portion provided for the guide rail portion and having a shape conforming to the regulating portion.

3. The instrumental device according to claim 2, wherein the regulating portion is formed of a protrusion portion protruding from the holding portion.

4. The instrumental device according to claim 2, wherein the regulating portion is formed of a rotation member rotating along the guide portion.

5. The instrumental device according to claim 2 wherein each of the regulating portion and the guide portion has an inclined surface, the inclined surfaces thereof abutting each other.

\* \* \* \* \*